(12) United States Patent
Wein et al.

(10) Patent No.: US 10,974,603 B2
(45) Date of Patent: Apr. 13, 2021

(54) METHOD FOR CONTROLLING A BRAKE SYSTEM FOR ADJUSTING A TOTAL BRAKE TORQUE DISTRIBUTION BETWEEN A FIRST AND A SECOND AXLE OF A MOTOR VEHICLE AND A BRAKE SYSTEM TO CARRY OUT THE PROCEDURE

(71) Applicant: AUDI AG, Ingolstadt (DE)

(72) Inventors: Michael Wein, Seubersdorf (DE); Matthias Geuß, Breitengüßbach (DE)

(73) Assignee: Audi AG, Ingolstadt (DE)

( * ) Notice: Subject to any disclaimer, the term of this patent is extended or adjusted under 35 U.S.C. 154(b) by 133 days.

(21) Appl. No.: 16/219,000

(22) Filed: Dec. 13, 2018

(65) Prior Publication Data
US 2019/0193571 A1 Jun. 27, 2019

(30) Foreign Application Priority Data
Dec. 18, 2017 (DE) .......................... 102017223064.9

(51) Int. Cl.
| | |
|---|---|
| *B60L 7/26* | (2006.01) |
| *B60L 7/18* | (2006.01) |
| *B60T 8/17* | (2006.01) |
| *B60T 8/172* | (2006.01) |
| *B60T 1/10* | (2006.01) |
| *B60T 8/26* | (2006.01) |

(Continued)

(52) U.S. Cl.
CPC .................... *B60L 7/26* (2013.01); *B60L 7/18* (2013.01); *B60T 1/10* (2013.01); *B60T 8/17* (2013.01); *B60T 8/172* (2013.01); *B60T 8/267* (2013.01); *B60T 13/586* (2013.01); *B60T 13/662* (2013.01); *B60T 2270/604* (2013.01)

(58) Field of Classification Search
CPC . B60L 7/26; B60L 7/18; B60T 13/662; B60T 13/586; B60T 8/17; B60T 8/172; B60T 8/267; B60T 1/10; B60T 2270/604
See application file for complete search history.

(56) References Cited

U.S. PATENT DOCUMENTS

| | | | |
|---|---|---|---|
| 6,231,134 B1* | 5/2001 | Fukasawa | B60L 7/26 |
| | | | 303/152 |
| 9,139,177 B1* | 9/2015 | Bolenbaugh | B60T 8/267 |

(Continued)

FOREIGN PATENT DOCUMENTS

| | | |
|---|---|---|
| DE | 102013215670 A1 | 2/2015 |
| DE | 102015106746 A1 | 11/2015 |

(Continued)

*Primary Examiner* — Rami Khatib
*Assistant Examiner* — Gabriel J Lambert
(74) *Attorney, Agent, or Firm* — Sterne, Kessler, Goldstein & Fox P.L.L.C.

(57) ABSTRACT

The invention relates to a method for controlling a braking system for setting a total braking torque distribution between a first and a second axle of a motor vehicle. The braking system includes a friction braking device and a recuperative braking device. The braking system has a total braking torque composed of a friction braking torque portion and a recuperative braking torque portion. The method include determining, for one axle, a minimal recuperation torque, which is set on that axle, and remains set on that axle for all driving situations as a recuperative braking torque portion.

6 Claims, 1 Drawing Sheet

(51) Int. Cl.
  *B60T 13/66* (2006.01)
  *B60T 13/58* (2006.01)

(56) References Cited

U.S. PATENT DOCUMENTS

| | | | | |
|---|---|---|---|---|
| 9,586,486 | B2* | 3/2017 | Kunz | B60T 8/267 |
| 2003/0230933 | A1* | 12/2003 | Schneider | B60T 1/10 |
| | | | | 303/146 |
| 2004/0122579 | A1* | 6/2004 | Ashizawa | G07C 5/08 |
| | | | | 701/70 |
| 2007/0029874 | A1* | 2/2007 | Finch | B60W 10/184 |
| | | | | 303/152 |
| 2009/0118887 | A1* | 5/2009 | Minarcin | B60K 6/547 |
| | | | | 701/22 |
| 2010/0138117 | A1* | 6/2010 | Witte | B60W 10/184 |
| | | | | 701/48 |
| 2010/0292882 | A1* | 11/2010 | Murata | B60L 58/12 |
| | | | | 701/22 |
| 2011/0251770 | A1* | 10/2011 | Minarcin | B60T 1/10 |
| | | | | 701/71 |
| 2012/0325573 | A1* | 12/2012 | Miller | B60L 15/2009 |
| | | | | 180/282 |
| 2013/0162009 | A1 | 6/2013 | Mitts et al. | |
| 2014/0333123 | A1* | 11/2014 | Kunz | B60T 8/267 |
| | | | | 303/3 |
| 2016/0059705 | A1* | 3/2016 | Kim | B60L 7/26 |
| | | | | 701/22 |
| 2016/0185228 | A1 | 6/2016 | Riedel et al. | |
| 2019/0111790 | A1* | 4/2019 | Crombez | B60T 1/10 |
| 2019/0193571 | A1* | 6/2019 | Wein | B60T 13/662 |

FOREIGN PATENT DOCUMENTS

| WO | WO 2006/029353 A2 | 3/2006 |
|---|---|---|
| WO | WO 2015/198119 A1 | 12/2015 |

* cited by examiner

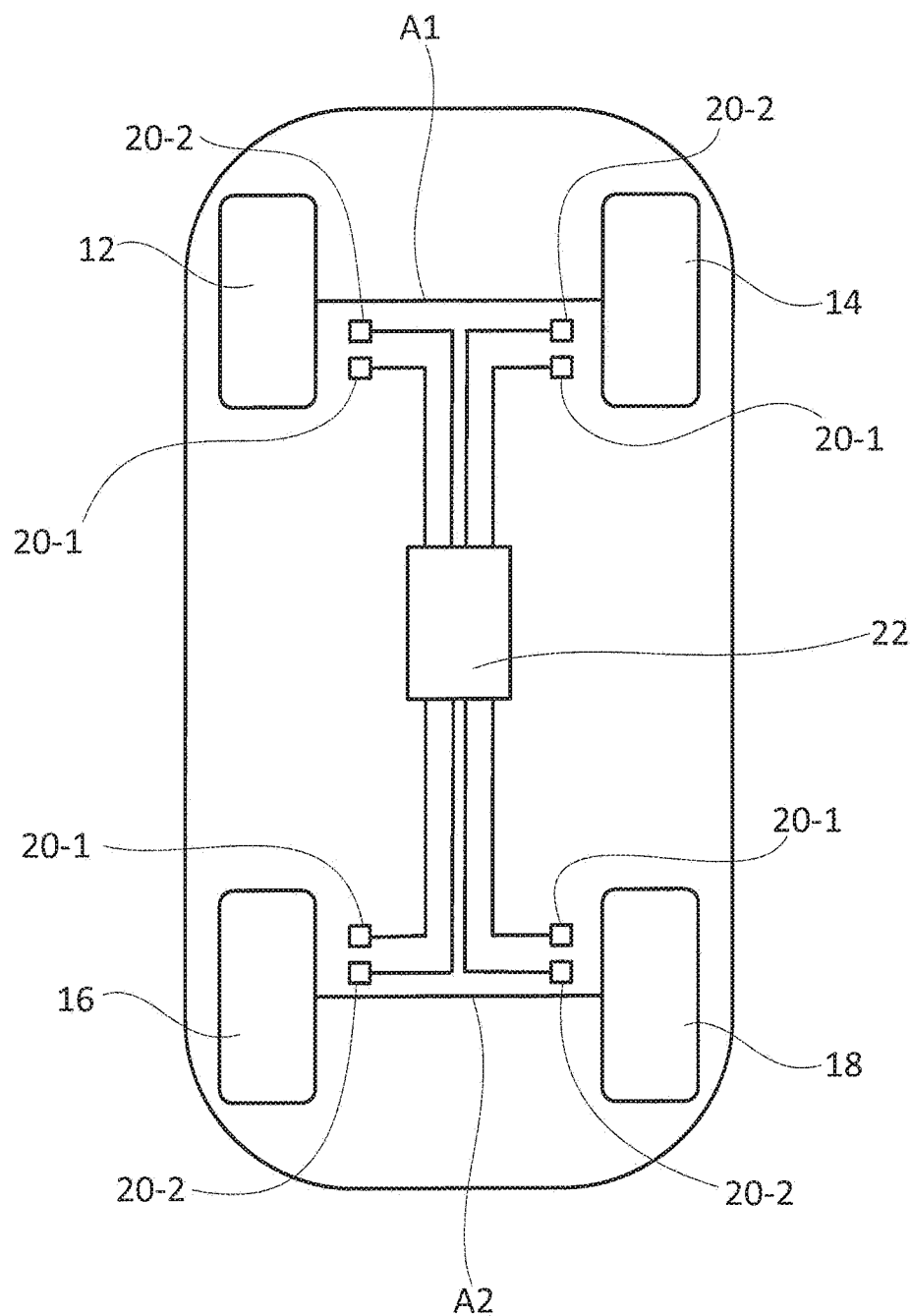

METHOD FOR CONTROLLING A BRAKE SYSTEM FOR ADJUSTING A TOTAL BRAKE TORQUE DISTRIBUTION BETWEEN A FIRST AND A SECOND AXLE OF A MOTOR VEHICLE AND A BRAKE SYSTEM TO CARRY OUT THE PROCEDURE

TECHNICAL FIELD

The invention relates to a method for controlling a braking system for setting a total braking torque between a first and a second axle of a motor vehicle according to the type indicated in the claims, as well as a braking system for implementing the method according to the claims.

BACKGROUND

Motor vehicles whose total braking torque is produced by a friction braking device producing a friction braking torque portion and a recuperative braking device producing a recuperative braking torque portion, as well as corresponding methods for controlling the braking system for setting a desired total braking torque distribution between the axles of the motor vehicle, are sufficiently known. By way of example, reference is made solely to DE 10 2015 106 746 A1.

As is known, in driving situations with threatening instability, the recuperative braking torque portion is cut back to zero, i.e., the total braking torque is produced solely by the friction braking device so as for example to make more working flexibility available for the ABS system. In this process it proves to be disadvantageous that—since the recuperative braking torque was cut back to zero—now consequently no more recuperative braking torque portion is made available for setting the total braking torque distribution.

BRIEF DESCRIPTION OF THE DRAWINGS/FIGURES

FIG. 1 illustrates a schematic representation of a motor vehicle for performing the method of controlling a braking system so as to set a total braking torque distribution between a first and second axle of a motor vehicle, according to some embodiments of this disclosure.

DETAILED DESCRIPTION

The invention is based on the task of providing a method for controlling a braking system for setting a total braking torque distribution by means of which even in the case of a threatening instability, the total braking torque to be distributed to the axles comprises a recuperative braking torque portion.

This task is achieved by the characteristic features of the claims.

The dependent claims also form advantageous further developments of the method according to the invention.

In a known manner, the total braking torque from a friction braking device producing a friction torque portion and from a recuperative braking device producing a recuperative braking torque portion are made available and the total braking torque in the case of a braking demand is distributed in a presettable braking torque ratio W1/W2 to the axles of the motor vehicle, wherein for the distribution of the friction braking torque portion to the axles, a constant friction braking torque distribution B1/B2 is preset.

According to the invention, it is now provided that—when B1≠W1—a minimal recuperation torque for one axle is determined that is set on the specific axle and remains set for all driving situations on the specific axle as the recuperative braking angle portion.

Due to the method according to the invention, it is now advantageously ensured that even in driving situations with a threatening instability, the distribution of the total braking torque onto the axles of the motor vehicle takes place with allowance for a recuperative braking torque portion.

That is, now according to the invention it is ensured that the total braking torque distribution according to the preset or desired braking torque ratio W1/W2 distributed to the axles always has a recuperative braking torque portion.

Toward this end, first the axle is determined on which the minimal recuperative torque is to be set and the minimal recuperation torque is calculated for this axle. Then the residual torque remaining for both axles is determined and the desired total braking torque distribution is set with allowance for the minimal recuperation torque to be set on the specific axle.

Here when W1<B1, it is determined that the minimal recuperation torque $M_{B,Rek,Min}$ is to be set on the second axle A2 and the minimal recuperation torque $M_{B,Rek,Min}$ is determined according to the rule $$M_{B,Rek,Min} = M_{B,Ges} * \left(1 - \frac{W1}{B1}\right).$$

The residual torque $M_{B,Reib,rest}$ remaining for both axles is calculated according to the rule $$M_{B,Reib,rest} = M_{B,Ges} * \frac{W1}{B1}.$$

On the second axle A1 there follows a residual torque portion $M_{B,Reib,A2}$ to be set of $$M_{B,Reib,A2} = M_{B,Reib,rest} * B2$$

and on the first axle A1 a residual friction torque $M_{B,Reib,A1}$ to be set of $$M_{B,Reib,A1} = M_{B,Reib,rest} * B1$$

For the case that W1>B1, it is determined that the minimal recuperation torque $M_{B,Rek,Min}$ is to be set on the first axle A1. In this case, the minimal recuperation torque $M_{B,Rek,Min}$ to be set on the first axial A1 is to be determined according to the rule $$M_{B,Rek,Min} = M_{B,Ges} * \left(1 - \frac{W2}{B2}\right)$$

and the remaining residual friction torque $M_{B,Reib,Rest}$ for the two axes according to the rule $$M_{B,Reib,rest} = M_{B,Ges} * \frac{W2}{B2}.$$

The residual friction torques $M_{B,Reib,A1}$ or $M_{B,Reib,A2}$ to be set on the first axle A1 or the second axle A2 result in $$M_{B,Reib,A1} = M_{B,Reib,rest} * B1$$

and $$M_{B,Reib,A2} = M_{B,Reib,rest} * B2$$

For the sake of completeness is it pointed out that in the above formulas, the values B1, B2, W1, and W2 should be entered as percentage values. That is, if the distribution B1/B2 or the ratio W1/W2 is not given as a percentage value, they have to be translated accordingly.

EXAMPLE 1

Given that W1/W2=1/1
Conversion to percentage values gives:

$$W1[\%] = \frac{W1}{W1+W2} * 100\% => W1 = 50\% = 0.5$$

or $$W2[\%] = \frac{W2}{W1+W2} * 100\% => W2 = 50\% = 0.5$$

EXAMPLE 2

Given that B1/B2=60/40
Conversion to percentage values gives:

$$B1[\%] = \frac{B1}{B1+B2} * 100\% => B1 = 60\% = 0.6$$

or $$B2[\%] = \frac{B2}{B1+B2} * 100\% => B2 = 40\% = 0.4$$

Furthermore, the object of the invention is to provide a braking system for implementing the method according to claims.

This object is also achieved by the braking system of the claims.

The braking system according to the invention comprises a friction braking device, a recuperative braking device, and an adjustment and control device, which controls the friction braking device and the recuperative braking device, so that in the case of a braking request, the total braking torque distribution can be set in the desired braking torque ratio W1/W2. The adjustment and control device is furthermore set up in such a way as to determine a minimal recuperation torque to be set on one axle and a remaining residual friction torque, and in the case of a braking request, to set the total braking torque distribution in the desired braking torque ratio W1/W2 with allowance for the minimal recuperation torque on the axles, wherein for all driving situations a minimal recuperation torque is set as a recuperative braking torque portion on one axle.

Through the braking system according to the invention, it is now ensured in an advantageous manner that the total braking torque distribution distributed according to the preset or desired braking torque ratio W1/W2 on the axles always has a recuperative braking torque portion.

Further advantages and possible applications of the present invention followed from the description below in association with the exemplary embodiment shown in the drawing.

The drawing shows:
FIG. 1 is a schematic representation of a motor vehicle for illustrating the method of controlling a braking system so as to set a total braking torque distribution between a first and second axle of a motor vehicle.

In a schematic representation, FIG. 1 shows a motor vehicle generally designated by the reference sign 10. The front axle, also designated below as the first axle, is designated by the reference sign A1, and the rear axle, also designated below as the second axle, is designated with the reference sign A2.

The wheels 12, 14 of the first axle A1 and the wheels 16, 18 of the second axle A2 are each assigned one here only schematically suggested friction braking device 20-1 as well as a recuperative braking device 20-2. The total braking torque to be produced by the friction braking device 20-1 and the recuperative braking device 20-2 is $M_{B,Ges}$=1,000 Nm, according some examples.

Here in a known manner the friction braking torque portion of the friction braking device 20-1 is distributed in a stably preset, constant friction torque ratio B1/B2 to the first axle A1 and the second axle A2. In this case the friction torque ratio B1/B2=60%/40%=0.6/0.4.

Via an adjustment and control device 22, the two braking devices 20-1, 20-2 are controllable such that the total braking torque is distributed in a preset, that is, desired braking torque ratio W1/W2 to the first and second axles A1 and A2. In this case the desired braking torque ratio W1/W2=50%/50%=0.5/0.5.

According to the invention, it is now provided that with setting of the desired braking torque ratios W1/W1=0.5/0.5 on one axle, a minimal recuperation torque $M_{B,Rek,Min}$ is set, which remains set on this axle for all driving situations as a recuperative braking torque portion.

According to the method, toward this end it is first determined on what axle the minimal recuperation torque $M_{B,Rek,Min}$ is to be set.

This occurs by means of a comparison of the values W1 and B1. According to the method, here the minimal recuperation torque $M_{B,Rek,Min}$ is to be set on the second axle A2 when W1<B1; otherwise, i.e., when W1>B1, the minimal recuperation torque $M_{B,Rek,Min}$ is to be set on the first axle A1.

Since, as stated, the friction torque ratio is B1/B2=0.6/0.4 and the desired braking torque ratio is W1/W1=0.5/0.5, presently W1<B1 and thus the minimal recuperation torque $M_{B,Rek,Min}$ should be set on the second, A2.

The minimal recuperation torque $M_{B,Rek,Min}$ is calculated according to the rule $$M_{B,Rek,Min,} = M_{B,Ges} * \left(1 - \frac{W1}{B1}\right)$$

and in the present case $M_{B,Rek,Min}$=167 Nm.

In a next step, according to the method, the remaining residual friction torque $M_{B,Reib,Rest}$ for both axes is calculated.

This is according to the rule $$M_{B,Reib,rest} = M_{B,Ges} * \frac{W1}{B1}$$

and in the present case $M_{B,Reib,Rest}$=833 Nm.

Then the residual friction torque $M_{B,Reib,A2}$ yet to be set on the second axle A2 and the residual friction torque $M_{B,Reib,A1}$ to be set on the first axle A1 are calculated.

In the present case this takes place according to the rule $$M_{B,Reib,A2} = M_{B,Reib,rest} * B2$$

or $$M_{B,Reib,A1} = M_{B,Reib,rest} * B1$$

yielding the values $M_{B,Reib,A2}$=333 Nm und $M_{B,Reib,A1}$=500 Nm.

By means of the adjustment and control device 22 now in the case of a braking request, the friction braking device 20-1 and the recuperative braking device 20-2 are accordingly controlled, so that on the second axle A2 the minimal recuperation torque $M_{B,Rek,Min}$=167 Nm, and a friction torque $M_{B,Reib,A2}$=333 Nm, and on the first axle A1, a friction torque of $M_{B,Reib,A1}$=500 Nm as the braking torque are made available.

The invention claimed is:

1. A method for controlling a braking system for setting a total braking torque distribution between a first axle and a second axle of a motor vehicle, wherein the braking system comprises a friction braking device and a recuperative braking device, wherein the braking system further comprises a total braking torque that is composed of a friction braking torque portion of the friction braking device and a recuperative braking torque portion of the recuperative braking device, and wherein when a braking request is distributed according to a preset braking torque ratio W1/W2 to the respective first and second axles, the friction braking torque portion is distributed according to a preset friction braking torque ratio B1/B2 to the respective first and second axles, wherein B1 is a percentage of the friction braking torque portion associated with the first axle, B2 is a percentage of the friction braking torque portion associated with the second axle, W1 is a percentage of the total braking torque associated with the first axle, and W2 is a percentage of the total braking torque associated with the second axle, the method comprising:

determining a minimal recuperation torque for one of the first or second axles in response to B1 not being equal to W1; and setting the minimal recuperation torque on the one of the first or second axles, wherein the minimal recuperation torque remains on the one of the first or second axles for all driving situations as the recuperative braking torque portion, and wherein the setting the minimal recuperation torque on the one of the first or second axles comprises:

in response to W1<B1, setting the minimal recuperation torque on the second axle, wherein the minimal recuperation torque is:

$$M_{B,Rek,Min,} = M_{B,Ges} * \left(1 - \frac{W1}{B1}\right),$$

wherein $M_{B,Ges}$ is the total braking torque,
wherein a remaining residual friction torque is calculated as:

$$M_{B,Reib,rest} = M_{B,Ges} * \frac{W1}{B1},$$

wherein a residual friction torque portion for the second axle is:

$M_{B,Reib,A2}$=$M_{B,Reib,rest}$*B2, and wherein a residual friction torque portion for the first axle is:

$M_{B,Reib,A1}$=$M_{B,Reib,rest}$*B1.

2. The method according to claim 1, further comprising: setting the total braking torque distribution with allowance for the minimal recuperation torque to be set on the second axle.

3. The method according to claim 2, wherein the setting the minimal recuperation torque on the one of the first or second axles comprises:

in response to W1>B1, setting the minimal recuperation torque on the first axle,
wherein the minimal recuperation torque is:

$$M_{B,Rek,Min,} = M_{B,Ges} * \left(1 - \frac{W2}{B2}\right),$$

wherein the remaining residual friction torque is:

$$M_{B,Reib,rest} = M_{B,Ges} * \frac{W2}{B2},$$

wherein a residual friction torque portion for the first axle is:

$M_{B,Reib,A1}$=$M_{B,Reib,rest}$*B1, and wherein a residual friction torque for the second axle is:

$M_{B,Reib,A2}$=$M_{B,Reib,rest}$*B2.

4. A braking system of a motor vehicle, the braking system comprising:

a friction braking device;
a recuperative braking device; and
an adjustment and control device configured to set a total braking torque distribution between a first axle and a second axle of the motor vehicle according to a braking torque ratio W1/W2, wherein W1 is a percentage of a total braking torque associated with the first axle, and W2 is a percentage of the total braking torque associated with the second axle,
wherein the total braking torque is composed of a friction braking torque portion of the friction braking device and a recuperative braking torque portion of the recuperative braking device,
wherein the friction braking torque portion is distributed according to a preset friction braking torque ratio B1/B2 to the first and second axles, wherein B1 is a percentage of the friction braking torque associated with the first axle, and B2 is a percentage of the friction braking torque associated with the second axle, and
wherein the adjustment and control device is configured to:
calculate a minimal recuperation torque to be set on one of the first axle or the second axle in response to B1 not being equal to W1; and
set the minimal recuperation torque on the one of the first or second axles, wherein for all driving situations the minimal recuperation torque remains set as a recuperative braking torque portion on the one of the first axle or the second axle,
wherein in response to W1<B1, the adjustment and control device is configured to set the minimal recuperation torque on the second axle,
wherein the minimal recuperation torque is:

$$M_{B,Rek,Min,} = M_{B,Ges} * \left(1 - \frac{W1}{B1}\right),$$

wherein $M_{B,Ges}$ is the total braking torque, wherein a remaining residual friction torque is calculated as:

$$M_{B,Reib,rest} = M_{B,Ges} * \frac{W1}{B1},$$

wherein a residual friction torque portion for the second axle is:

$M_{B,Reib,A2} = M_{B,Reib,rest} * B2$, and wherein a residual friction torque portion for the first axle is:

$M_{B,Reib,A1} = M_{B,Reib,rest} * B1$, and wherein in response to W1>B1, the adjustment and control device is configured to set the minimal recuperation torque on the first axle, wherein the minimal recuperation torque is:

$$M_{B,Rek,Min,} = M_{B,Ges} * \left(1 - \frac{W2}{B2}\right),$$

wherein the remaining residual friction torque is calculated as:

$$M_{B,Reib,rest} = M_{B,Ges} * \frac{W2}{B2},$$

wherein a residual friction torque portion for the first axle is:

$M_{B,Reib,A1} = M_{B,Reib,rest} * B1$, and wherein a residual friction torque for the second axle is:

$M_{B,Reib,A2} = M_{B,Reib,rest} * B2$.

5. The braking system according to claim 4, wherein the adjustment and control device is further configured to:
set the total braking torque distribution with allowance for the minimal recuperation torque to be set on the one of the first or second axles.

6. A method for controlling a braking system for setting a total braking torque distribution between a first axle and a second axle of a motor vehicle, wherein the braking system comprises a friction braking device and a recuperative braking device, wherein the braking system further comprises a total braking torque that is composed of a friction braking torque portion of the friction braking device and a recuperative braking torque portion of the recuperative braking device, and wherein when a braking request is distributed according to a preset braking torque ratio W1/W2 to the respective first and second axles, the friction braking torque portion is distributed according to a preset friction braking torque ratio B1/B2 to the respective first and second axles, wherein B1 is a percentage of the friction braking torque portion associated with the first axle, B2 is a percentage of the friction braking torque portion associated with the second axle, W1 is a percentage of the total braking torque associated with the first axle, and W2 is a percentage of the total braking torque associated with the second axle, the method comprising:

determining a minimal recuperation torque for one of the first or second axles in response to B1 not being equal to W1; and setting the minimal recuperation torque on the one of the first or second axles, wherein the minimal recuperation torque remains on the one of the first or second axles for all driving situations as the recuperative braking torque portion, and wherein the setting the minimal recuperation torque on the one of the first or second axles comprises:

in response to W1>B1, setting the minimal recuperation torque on the first axle, wherein the minimal recuperation torque is:

$$M_{B,Rek,Min,} = M_{B,Ges} * \left(1 - \frac{W2}{B2}\right),$$

wherein a remaining residual friction torque is calculated as:

$$M_{B,Reib,rest} = M_{B,Ges}^{*} \frac{W2}{B2},$$

wherein a residual friction torque portion for the first axle is:

$M_{B,Reib,A1} = M_{B,Reib,rest} * B1$, and wherein a residual friction torque for the second axle is:

$M_{B,Reib,A2} = M_{B,Reib,rest} * B2$.

* * * * *